Figure 1:
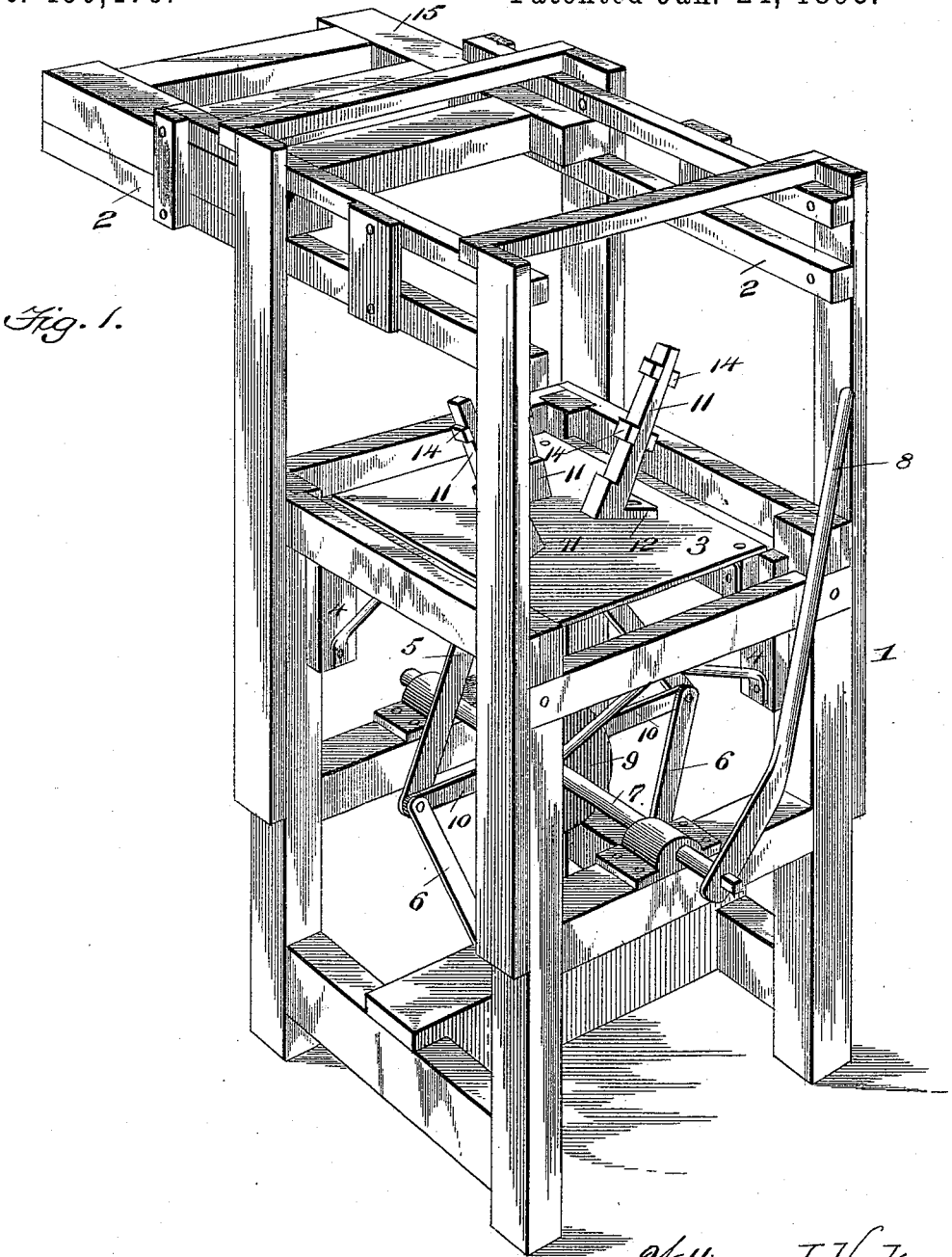

(No Model.)
3 Sheets—Sheet 2.
W. J. HOOK.
HOOP DRIVING MACHINE.
No. 490,476.
Patented Jan. 24, 1893.
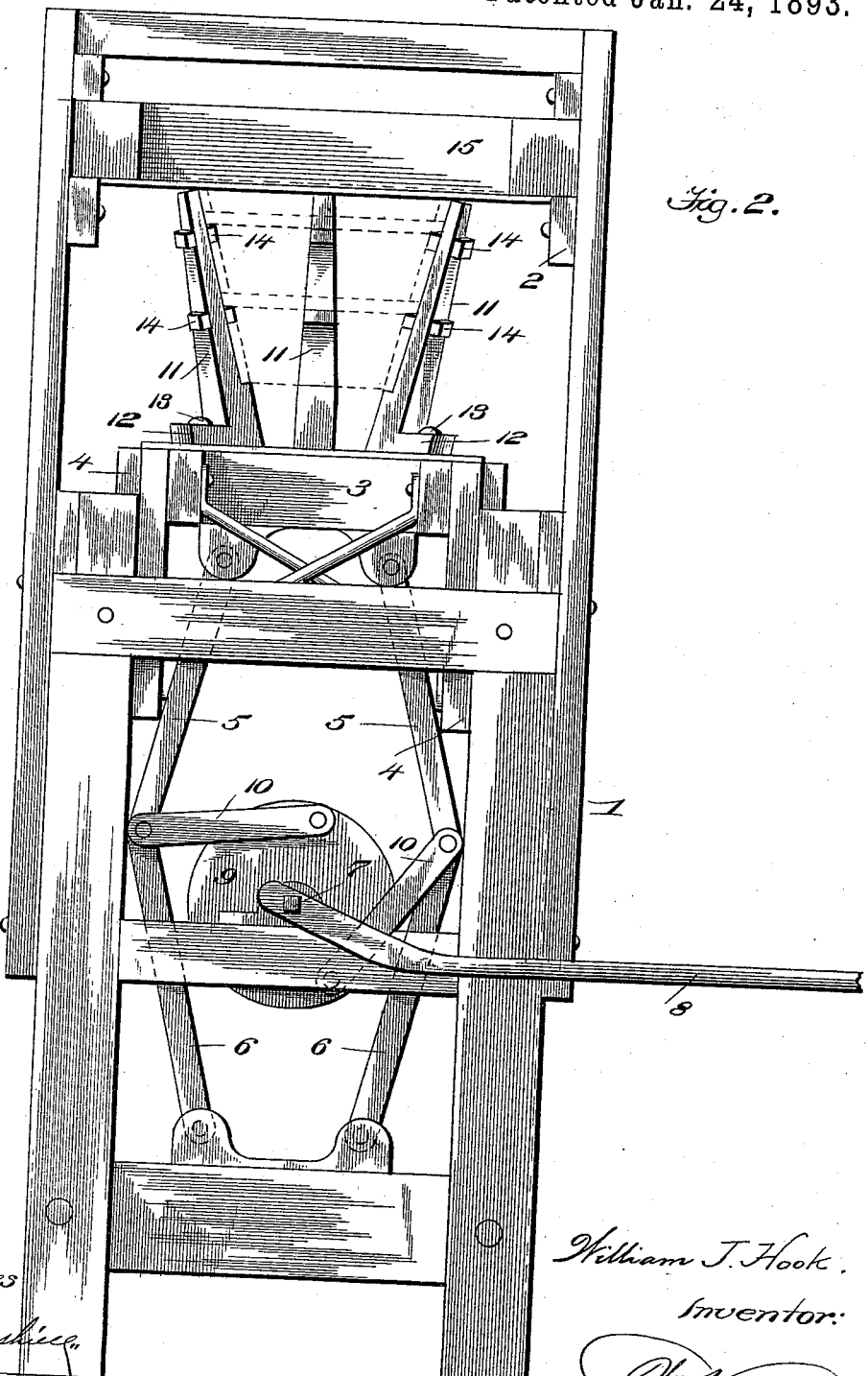
Fig. 2.
Witnesses
Wm C Dashiell
May E. Moore
William J. Hook.
Inventor:
By 
Attorney.

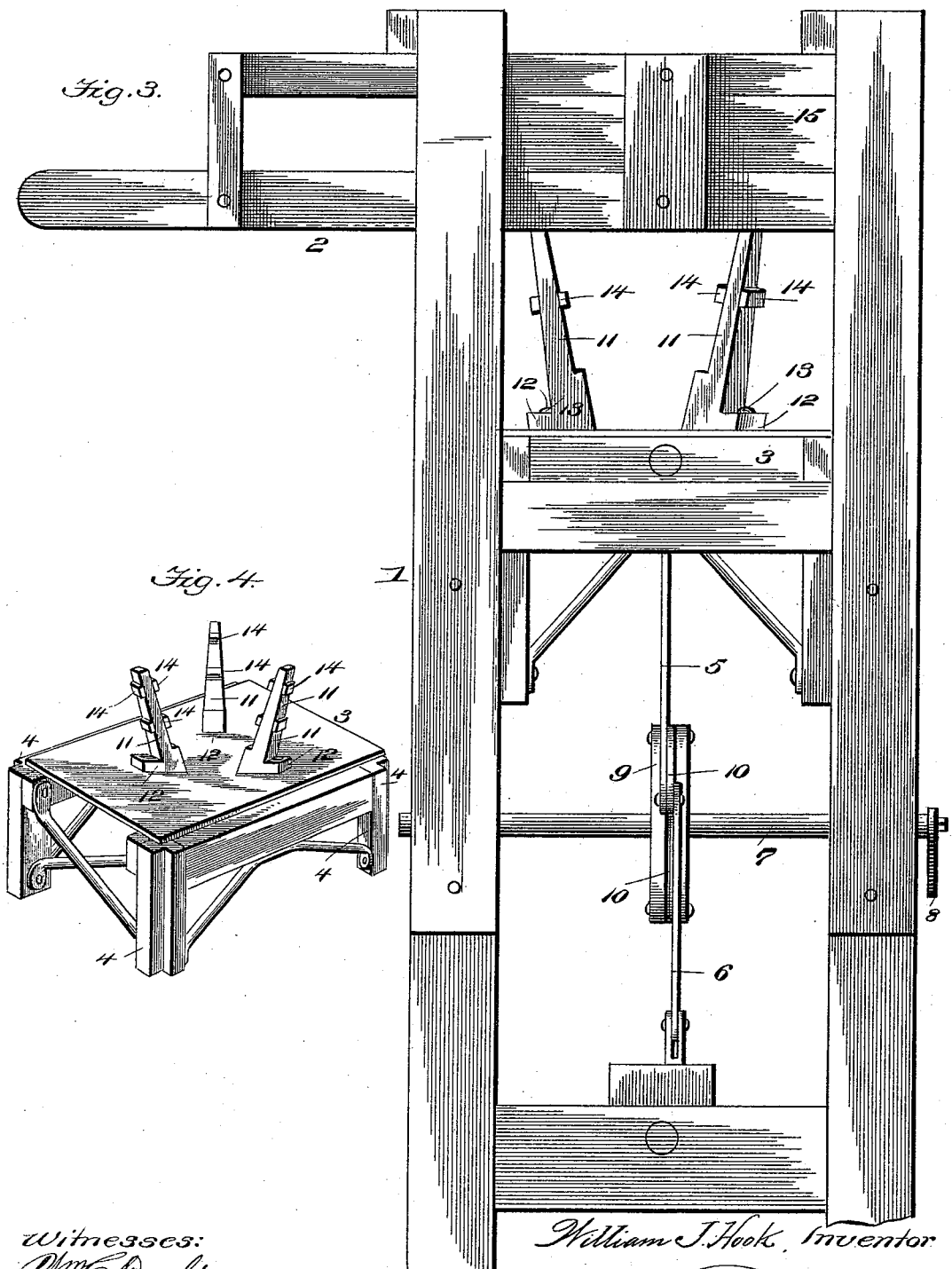

United States Patent Office.

WILLIAM J. HOOK, OF UNION CITY, INDIANA.

HOOP-DRIVING MACHINE.

SPECIFICATION forming part of Letters Patent No. 490,476, dated January 24, 1893.

Application filed April 1, 1892. Serial No. 427,367. (No model.)

*To all whom it may concern:*

Be it known that I, WILLIAM J. HOOK, a citizen of the United States, residing at Union City, in the county of Randolph and State of Indiana, have invented certain new and useful Improvements in Trussing and Hoop-Driving Machines; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in machines for trussing tubs, pails, barrels and the like, or more plainly speaking a machine for trussing and also placing hoops on tubs and similar vessels.

The leading object of my invention is the provision of a machine of this character which will dispense with the complicated and expensive mechanism heretofore generally employed and provide a machine which will be the embodiment of simplicity and durability and capable of production at a very low price.

Another object of my invention is the provision of a trussing and hoop driving machine adapted to be operated by hand or other power and which will truss and place the hoops on the tubs or similar vessels securely and very rapidly.

Another object of my invention is the provision of a trussing and hoop driving machine adapted to truss and place hoops of any size on the tubs and which allows the tubs or vessels to be easily and quickly applied and removed from the machine; thus producing a machine possessing all the features of merit to render it thoroughly practical and economical.

To attain the objects stated my invention consists of certain improvements in construction and combination of parts producing a novel and efficient machine for trussing and hooping tubs, barrels and like vessels.

In order that the construction, operation and advantages of my machine may be readily understood I have illustrated an embodiment of my improvements in the accompanying drawings, in which—

Figure 1 represents a perspective view of my machine with the parts in the position they assume preparatory to trussing or driving the hoops. Fig. 2 represents an elevation of the machine with the parts in the position they assume when the trussing is being effected or the hoops are being placed or secured upon the tub or vessel. Fig. 3 represents a side elevation of the machine to more clearly show the sliding platen or board and the guide frame therefor. Fig. 4 represents a detail view to clearly show the construction of the trussing and hoop carrying and placing devices.

Referring by numerals to the drawings in which similar numerals denote corresponding parts—The numeral 1 designates the frame of my machine made substantially as shown and of any desired proportions and having the guide frame 2 at the upper part thereof for a purpose to be described. The main frame it will be seen is open at the top and this is an important feature as it permits the application and withdrawal of the tub, barrel or keg without interference.

In the frame is mounted a follower, plunger or bed 3, having guide arms 4 connected and braced to provide a strong and rigid structure, and to the lower side of the follower are pivotally connected the upper ends of links 5, 5, the lower ends thereof being pivotally connected to the links 6, 6 having their lower ends pivoted to the frame of the machine, all as clearly shown.

In the frame is journaled a shaft 7 adapted to be oscillated by hand or manual power or by any other driving power, but in this instance a hand lever or handle 8 is used, and secured to the shaft is the double wheel 9. To this wheel on each side of the shaft and opposite to each other are pivoted the inner ends of the arms 10, the outer ends thereof being pivoted to the links 5 and 6 at their pivotal connection with each other. From this construction it is evident that when the follower or bed is at its lowest point the arms 10 are in a horizontal position and the links 5 and 6 are inclined or spread at their point of connection with the arms; now immediately upon oscillating the shaft the wheel turns bringing in the arms and causing the links to approach the shaft and consequently move the follower or bed upward, by the spreading and contracting of the links it will thus be seen the follower is moved.

Carried by the follower are the inclined uprights 11 having the slotted feet 12, adjustable by means of screws 13 to receive vessels or hoops of any desired size, and the uprights also carry the hoop trussing and guiding and holding lugs 14. I have shown in this instance three uprights but more may be used if deemed necessary.

It will be seen that the uprights are adjustable to accommodate vessels of varying sizes and that the vessel, by reason of the frame being open at the top can be placed upon the lugs of the uprights and removed through the open frame. This is an important feature as in other machines one or more of the uprights must be pivoted to allow the application and removal of the vessel. Also the follower has a short distance to travel in the frame and greater force or pressure can be exerted thereby, as is evident.

In the guide frame is arranged the board or platen 15 which acts as a stop or abutment against which the tub is forced when the hoops are being adjusted.

The operation of my machine will be readily apparent from the drawings and description and I will simply state that the tub is placed on the uprights in trussing without hoops and with the hoops loosely applied; the board or platen is moved above the follower and when the shaft is oscillated the follower is elevated until the tub rests against the board and the lugs on the uprights engaging the hoops force them on the tub firmly. The board is moved aside, new hoops and tub applied and the operation repeated.

It will thus be seen that by my machine the hoops can be rapidly and securely driven on the tubs and by reason of the simplicity, cheapness and thorough efficiency of my machine much time, labor and money will be saved by its use.

I claim:—

1. In a trussing and hoop driving machine, the combination of a frame, open or free at the top to allow the insertion and removal of the vessel, a guide or supplemental frame, a board or platen moving in the said supplemental frame and adapted to close the open end of the main frame to provide an abutment, a follower mounted in the main frame, mechanism for moving the follower, uprights carried by the follower having feet formed with slots, screws or bolts passing through said slots for adjustably securing the uprights, and lugs on the uprights for receiving the hoops, all adapted to operate in the manner described.

2. In a trussing and hoop driving machine, the combination of the main frame, open at the top to allow the insertion and removal of the vessel, the guide frame, the board or platen movable in said frames, and closing the open end of the main frame to form a stop or abutment, the follower in the main frame, the levers connected to the follower and to the frame, the oscillating disks, the links connecting the levers and disks, the uprights carried by the follower and having the adjustable feed and lugs to hold the hoops, substantially as described.

In testimony whereof I affix my signature in presence of two witnesses.

WM. J. HOOK.

Witnesses:
J. L. HECK,
J. J. DOWNING.